United States Patent
Seki

(10) Patent No.: US 6,806,894 B2
(45) Date of Patent: Oct. 19, 2004

(54) IMAGE FORMING APPARATUS AND MAIN SCANNING SCALE CORRECTING METHOD THEREFOR

(75) Inventor: Yuichi Seki, Saitama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 10/631,473

(22) Filed: Jul. 31, 2003

(65) Prior Publication Data

US 2004/0100548 A1 May 27, 2004

(30) Foreign Application Priority Data

| Jul. 31, 2002 | (JP) | .................................... 2002-224095 |
| Apr. 2, 2003 | (JP) | .................................... 2003-099305 |
| Jun. 12, 2003 | (JP) | .................................... 2003-167801 |

(51) Int. Cl.$^7$ ............................................. B41J 2/385
(52) U.S. Cl. ..................... 347/135; 347/255; 347/247
(58) Field of Search ............................. 347/135, 136, 347/137, 131–132, 225, 233, 247, 255, 248, 237; 358/474, 1.7, 1.18

(56) References Cited

U.S. PATENT DOCUMENTS

| 4,862,289 A | * | 8/1989 | Shimada .................... 358/474 |
| 5,708,514 A | * | 1/1998 | Higuchi et al. ............ 358/406 |
| 5,815,287 A | * | 9/1998 | Yamada ....................... 358/448 |
| 6,154,246 A | * | 11/2000 | Ogasawara et al. ......... 347/250 |
| 6,636,251 B2 | * | 10/2003 | Saitou et al. ............... 347/131 |
| 6,690,498 B2 | * | 2/2004 | Shim .......................... 359/216 |
| 6,731,317 B2 | * | 5/2004 | Ema et al. .................. 347/135 |

FOREIGN PATENT DOCUMENTS

JP        2000238342 A    9/2000

* cited by examiner

Primary Examiner—Eugene H. Eickholt
(74) Attorney, Agent, or Firm—Rossi & Associates

(57) ABSTRACT

There is provided an image forming apparatus that is capable of securing required printing quality by properly correcting a main scanning scale. In a pixel division modulating process, for each of one or more correction points (at l-th, m-th, and n-th pixels) on each of lines along which scanning is carried out on a photosensitive drum 11 by laser light, the final bit data of pixel-division-modulated pixel data of a pixel immediately preceding each correction point is added to the pixel data of a pixel located at the correction point as the leading bit data of the pixel-division-modulated pixel data of this pixel. The same processing as above is sequentially performed on pixel data of pixels located subsequently to the correction point to sequentially shift predetermined bit data of pixel data of pixels to pixel data of the respective following pixels, to thereby generate pixel data of a new pixel. The generated pixel data of the new pixel is outputted in synchronism with an image clock of a fixed frequency.

16 Claims, 10 Drawing Sheets

IMAGE FORMING APPARATUS AND MAIN SCANNING SCALE CORRECTING METHOD THEREFOR

BACKGROUND OF THE INVENTION

1. Field of the Invention

The present invention relates to an image forming apparatus that forms a latent image on a latent image carrier by performing pixel division modulation on an input image signal, driving a laser light source based on the pixel-division-modulated image signal to modulate a laser beam emitted from the laser light source, and scanning the latent image carrier using the modulated laser beam, and a main scanning scale correcting method for such an image forming apparatus.

2. Description of the Related Art

In general, an image forming apparatus such as a laser beam printer or a digital copier is configured to form a latent image by using a laser beam driving circuit to drive a semiconductor laser using an image signal to modulate a laser beam emitted by the semiconductor laser, and raster-scanning the modulated laser beam over on a photosensitive drum using a rotary polygon mirror.

In an apparatus of this type having a plurality of semiconductor lasers, the scale of the latent image varies depending on a position on the photosensitive drum which is irradiated with a laser beam from each of the semiconductor lasers. Further, the rotary polygon mirror has finish accuracies between the surfaces thereof. Accordingly, a position at which a latent image starts to be drawn varies depending on the surface. Furthermore, with an image forming apparatus that can print on both surfaces of a sheet, the size of the sheet decreases after fixation, and consequently the size of a printed image on one surface of the sheet differs from that of an image on the other surface even if the proportion of the latent image on one surface is the same as that of the latent image on the other surface.

To solve this problem, a method has been proposed in which the size of a printed image is corrected by applying, at a desired point, an image clock used to transfer image data to control the length between adjacent image data (for example, Japanese Laid-Open Patent Publication (Kokai) No. 2000-238342).

However, in the above conventional method, the image clock is corrected, and the image data to be interpolated is fixed. Consequently, blank spaces may be created in those portions of the data in which the image clock is slightly elongated. Therefore, printing quality may be degraded.

SUMMARY OF THE INVENTION

It is a first object of the present invention to provide an image forming apparatus that is capable of securing required printing quality by properly correcting a main scanning scale, and a main scanning scale correcting method for such an image forming apparatus.

It is a second object of the present invention to provide an image forming apparatus that is capable of securing required printing quality by properly correcting a printing proportion, and a main scanning scale correcting method for such an image forming apparatus.

To attain the first object, in a first aspect of the present invention, there is provided an image forming apparatus comprising a pixel division modulating device that performs pixel-division modulation on an input image signal and outputs the pixel-division-modulated image signal in synchronism with an image clock of a fixed frequency, a laser light source, a driving device that drives the laser light source based on the image signal outputted from the pixel division modulating device to modulate laser light emitted from the laser light source, a latent image carrier, and a scanning device that scans the latent image carrier using the laser light emitted from the laser light source to form a latent image on the latent image carrier, the pixel division modulating device comprises a correction device that, for each of at least one correction point on one of lines along which scanning is carried out on the latent image carrier by laser light, adds final bit data of pixel-division-modulated pixel data of a pixel preceding the correction point to pixel-division-modulated pixel data of a pixel located at the correction point as leading bit data thereof, and sequentially shifts predetermined bit data of pixel-division-modulated pixel data of each of pixels subsequent to the correction point to a next pixel to generate pixel data of at least one new pixel added for the one line, and an output device that outputs the pixel data of the generated at least one new pixel in synchronism with the image clock of the fixed frequency.

To attain the first object, in a second aspect of the present invention, there is provided an image forming apparatus comprising a pixel division modulating device that performs pixel-division modulation on an input image signal and outputs the pixel-division-modulated image signal in synchronism with an image clock of a fixed frequency, a laser light source, a driving device that drives the laser light source based on the image signal outputted from the pixel division modulating device to modulate laser light emitted from the laser light source; a latent image carrier, and a scanning device that scans the latent image carrier using the laser light emitted from the laser light source to form a latent image on the latent image carrier, the pixel division modulating device comprises a correction device that, for each of at least one correction point on one of lines along which scanning is carried out on the latent image carrier by laser light, adds leading bit data of pixel-division-modulated pixel data of a pixel preceding the correction point to pixel-division-modulated pixel data of a pixel located at the correction point as leading bit data thereof, and sequentially shifts predetermined bit data of pixel-division-modulated pixel data of each of pixels subsequent to the correction point to a next pixel to generate pixel data of at least one new pixel added for the one line, and an output device that outputs the pixel data of the generated at least one new pixel in synchronism with the image clock of the fixed frequency.

To attain the first object, in a third aspect of the present invention, there is provided a main scanning scale correcting method for an image forming apparatus comprising a pixel division modulating device that performs pixel-division modulation on an input image signal and outputs the pixel-division-modulated image signal in synchronism with an image clock of a fixed frequency, a laser light source, a driving device that drives the laser light source based on the image signal outputted from the pixel division modulating device to modulate laser light emitted from the laser light source, a latent image carrier, and a scanning device that scans the latent image carrier using the laser light emitted from the laser light source to form a latent image on the latent image carrier, the method comprising the steps of adding, for each of at least one correction point on one of lines along which scanning is carried out on the latent image carrier by laser light, final bit data of pixel-division-modulated pixel data of a pixel preceding the correction point to pixel-division-modulated pixel data of a pixel located at the correction point as leading bit data thereof, and sequentially shifting predetermined bit data of pixel-division-modulated pixel data of each of pixels subsequent to the correction point to a next pixel to generate pixel data of at least one new pixel added for the one line, and outputting the pixel data of the generated at least one new pixel in synchronism with the image clock of the fixed frequency.

To attain the first object, in a fourth aspect of the present invention, there is provided a main scanning scale correcting method for an image forming apparatus comprising a pixel division modulating device that performs pixel-division modulation on an input image signal and outputs the pixel-division-modulated image signal in synchronism with an image clock of a fixed frequency, a laser light source, a driving device that drives the laser light source based on the image signal outputted from the pixel division modulating device to modulate laser light emitted from the laser light source, a latent image carrier, and a scanning device that scans the latent image carrier using the laser light emitted from the laser light source to form a latent image on the latent image carrier, the method comprising the steps of adding, for each of at least one correction point on one of lines along which scanning is carried out on the latent image carrier by laser light, leading bit data of pixel-division-modulated pixel data of a pixel preceding the correction point to pixel-division-modulated pixel data of a pixel located at the correction point as leading bit data thereof, and sequentially shifting predetermined bit data of pixel-division-modulated pixel data of each of pixels subsequent to the correction point to a next pixel to generate pixel data of at least one new pixel added for the one line and outputting the pixel data of the generated at least one new pixel in synchronism with the image clock of the fixed frequency.

Preferably, in the first to fourth aspects, the at least one correction point are determined in advance.

Also preferably, in the first to fourth aspects, the number of the at least one correction point is determined to be an integral multiple of resolution of pixel division modulation executed by the pixel division modulating device.

Also preferably, in the first and second aspects, the image forming apparatus further comprises an image write reference signal output device that outputs an image write reference signal, and a delay device that delays timing in which output of the pixel data is started in synchronism with the image clock of the fixed frequency, by a predetermined time period for each of preset lines in response to the image write reference signal.

Also preferably, in the third and fourth aspects, the image forming apparatus further comprises an image write reference signal output device that outputs an image write reference signal, and the method further comprises a step of delaying timing in which output of the pixel data is started in synchronism with the image clock of the fixed frequency, by a predetermined time period for each of preset lines in response to the image write reference signal.

To attain the second object, in a fifth aspect of the present invention, there is provided an image forming apparatus according to the first and second aspects which each further comprises an image write reference signal output device that outputs an image write reference signal, and a delay device that delays timing in which output of the pixel data is started in synchronism with the image clock of the fixed frequency, by a predetermined time period for each of preset lines in response to the image write reference signal.

To attain the second object, in a sixth aspect of the present invention, there is provided a main scanning scale correcting method according to the third and fourth aspects, wherein the image forming apparatus further comprises an image write reference signal output device that outputs an image write reference signal, and wherein the method further comprises a step of delaying timing in which output of the pixel data is started in synchronism with the image clock of the fixed frequency, by a predetermined time period for each of preset lines in response to the image write reference signal.

According to the first to fourth aspects of the present invention, it is possible to secure required printing quality by properly correcting the main scanning scale.

According to the fifth and sixth aspects of the present invention, it is possible to secure required printing quality by properly correcting the printing proportion.

The above and other objects, features, and advantages of the present invention will become more apparent from the following detailed description taken in conjunction with the accompanying drawings.

DETAILED DESCRIPTION OF THE PREFERRED EMBODIMENTS

Figure 1A:
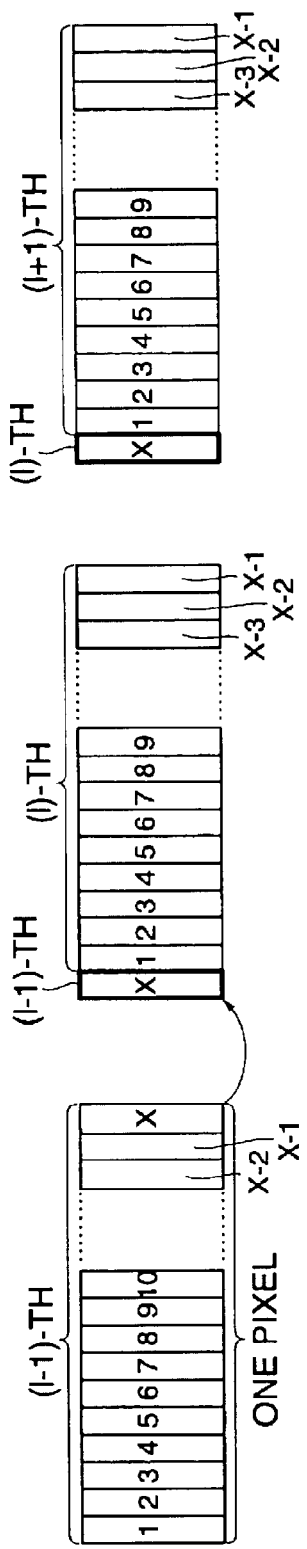
FIG. 1 is a conceptual view showing how an image signal is processed by a main scanning scale correction method according to an embodiment of the present invention.

The present invention will now be described in detail below with reference to the accompanying drawings showing a preferred embodiment thereof. In the drawings, elements and parts which are identical throughout the views are designated by identical reference numerals, and duplicate description thereof is omitted.

First, a description will be given of the principle of a main scanning scale correcting method according to an embodiment of the present invention with reference to FIG. 1. FIG. 1 is a conceptual view showing how an image signal is processed by a main scanning scale correction method according to an embodiment of the present invention.

In the main scanning scale correcting method according to the present embodiment, for each of one or more correction points on each of lines along which scanning is carried out on a photosensitive drum by laser light, the final bit data of pixel-division-modulated pixel data of a pixel immediately preceding each correction point is added to the pixel data of a pixel located at the correction point as the leading bit data of the pixel-division-modulated pixel data of this pixel. The same processing as above is sequentially performed on pixel data of pixels located subsequently to the correction point to sequentially shift predetermined bit data of pixel data of pixels to pixel data of the respective following pixels. Thus, pixel data of a new pixel is generated and added to the pixel data of the pixels on the line. Then, the generated pixel data of the new pixel is outputted in synchronism with an image clock of a fixed frequency. Here, the term "main scanning scale" refers to a scanning width on the photosensitive drum with which scanning is carried out in the main scanning direction by laser light.

Figure 1B:
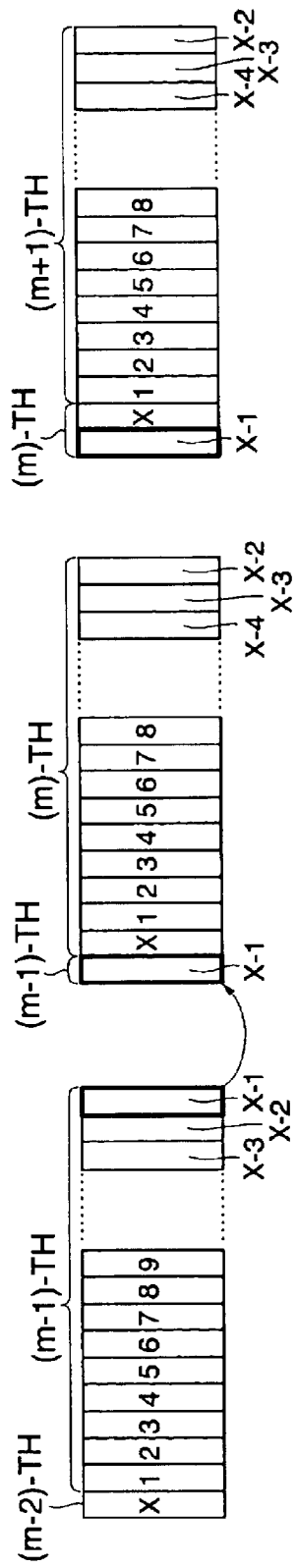
Figure 1C:
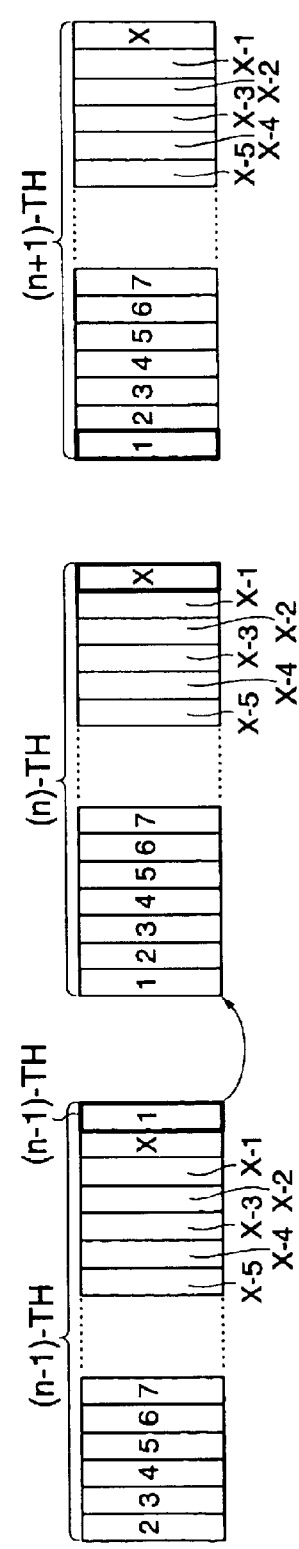

Image data constituting an image signal is assumed to be composed of a pixel-division-modulated data row of pixel data of $\chi$ bits, for example, as shown in FIGS. 1A to 1C. Further, all the image data in FIGS. 1A to 1C are present on the same line. Here, the l-th, m-th, and n-th pixels on the same line are assumed to be correction points for the main scanning scale correcting process.

First, for the l-th pixel, as shown in FIG. 1A, for example, the final bit data, i.e. the $\chi$-th bit data of the (l−1)-th pixel is added to the l-th pixel as its leading bit data. In the l-th pixel, the final bit data of the (l−1)-th pixel is added to this pixel as its leading bit data. Consequently, the original final bit data x of the l-th pixel is shifted to the next pixel, i.e. the (l+1)-th pixel, as the leading bit data. In the same manner as above, in each of the subsequent pixels, one bit data is sequentially shifted to the next pixel.

Due to this sequential shifting of bit data to each next pixel, as shown in FIG. 1B, the (m−1)-th pixel is assumed to have shifted to this pixel the final bit data x of the immediately preceding (m−2)-th pixel as its leading bit data so that the original ($\chi$−1)-th bit data of the (m−1)-th pixel becomes the final bit data thereof. Further, the m-th pixel is assumed to have shifted to this pixel the final bit data ($\chi$-th bit) of the (m−1)-th pixel as its leading bit data so that the original ($\chi$−2)-th bit data of this pixel becomes the final bit data thereof.

Here, in the m-th pixel as the next correction point, the final bit data of the (m−1)-th pixel is the ($\chi$−1)-th bit data. Accordingly, this ($\chi$−1)-th bit data is added to the m-th pixel as its leading bit data. Thus, 2-bit data is shifted from the m-th pixel to the (m+1)-th pixel. That is, the ($\chi$−1)-th bit data and the $\chi$-th bit data, which were originally present in the m-th pixel, are shifted to the (m+1)-th pixel as its leading bit data and the succeeding bit data. Accordingly, in the same manner as above, 2 bits of each of the subsequent pixels are sequentially shifted to the next pixel.

It is assumed that as a result of the above shifting of bit data to each next pixel, the last (x−2) pieces of bit data of the (n−2) pixel are shifted to the (n−1)-th pixel as the first (x−2) pieces of bit data thereof, and the final bit data of the (n−1)-th pixel becomes equal to the original leading bit 1 of the (n−1)-th pixel, as shown in FIG. 1C.

In the n-th pixel as the next correction point, the final bit data of the (n−1)-th pixel is added to the n-th pixel as its leading bit data, so that the data of the n-th pixel is identical to the data of the (n−1)-th pixel. Accordingly, the (n+1)-th pixel is composed of the same data as the data of the n-th pixel.

In the above described way, in the present example, the number n of pixels on one line is increased to (n+1). That is, the above described main scanning scale correcting process can increase the number of pixels on one line to thereby correct the main scanning scale.

Figure 2:
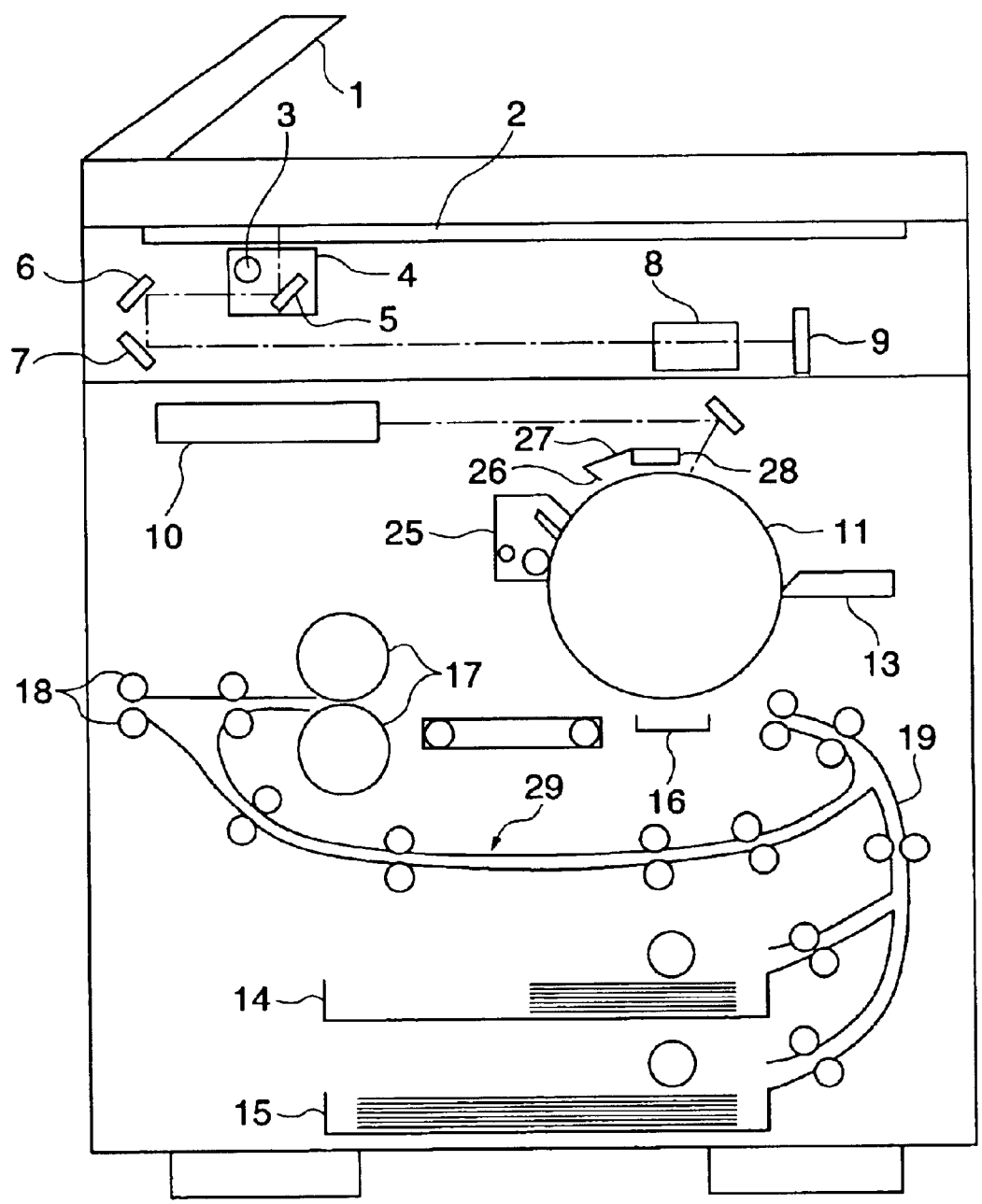
FIG. 2 is a longitudinal sectional view schematically showing an image forming apparatus according to an embodiment of the present invention.
Figure 3:
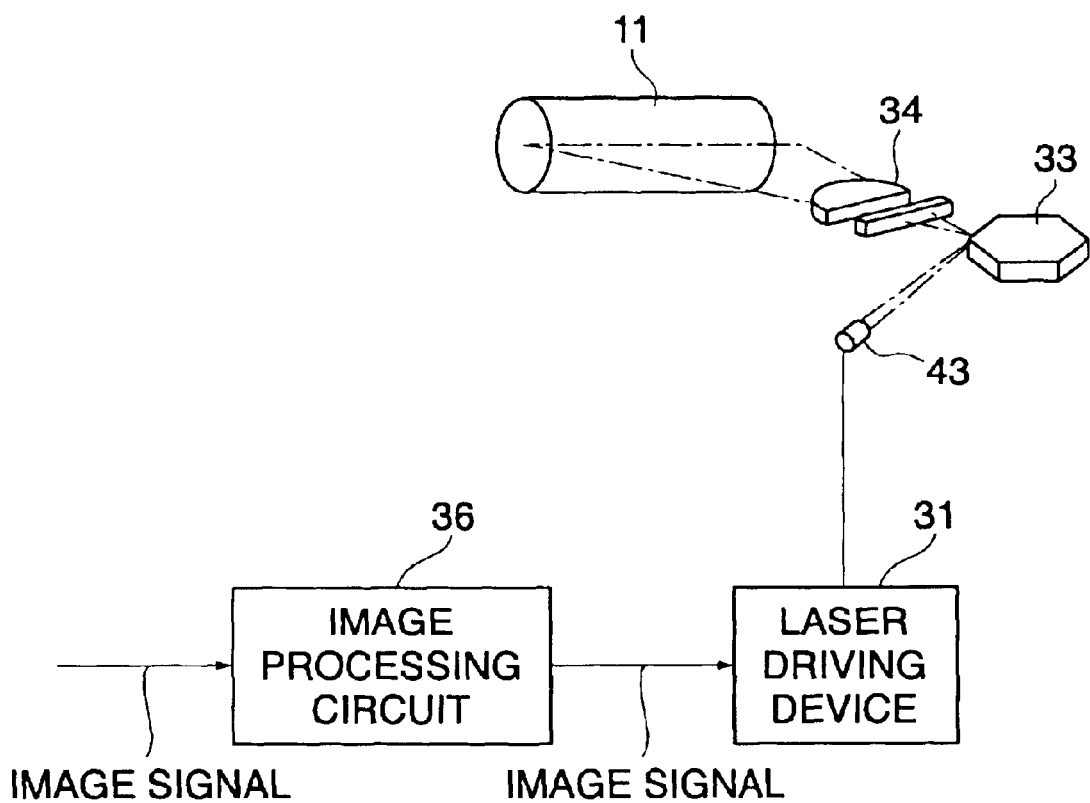
FIG. 3 is a block diagram showing the configuration of an exposure controller 10 appearing in FIG. 2.
Figure 4:
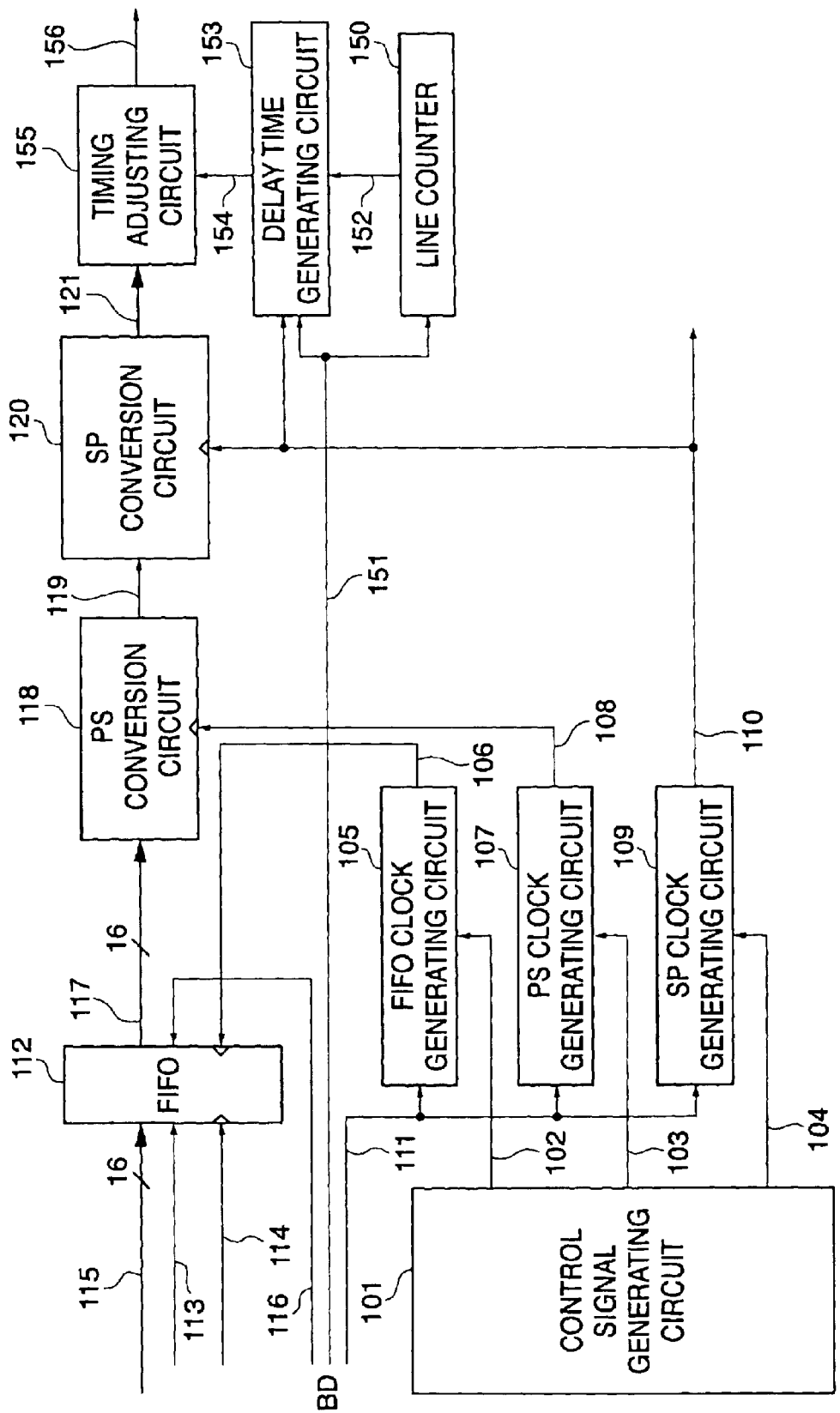
FIG. 4 is a block diagram showing the configuration of an image processing circuit appearing in FIG. 3.

Then, a description will be given of the specific configuration of an image forming apparatus that can implement the main scanning scale correcting process with reference to FIGS. 2 to 4. FIG. 2 is a longitudinal sectional view schematically showing the image forming apparatus according to the present embodiment. FIG. 3 is a block diagram showing the configuration of an exposure controller 10 appearing in FIG. 2. FIG. 4 is a block diagram showing the configuration of an image processing circuit appearing in FIG. 3.

As shown in FIG. 2, the image forming apparatus is provided with an original feeder 1 on which a plurality of originals can be stacked, and a scanner unit 4 that is disposed to move in the sub-scanning direction. The original feeder 1 conveys the plurality of stacked originals to an original platen glass 2 sheet by sheet starting from the uppermost sheet. The scanner unit 4 is provided with a lamp 3 that illuminates the originals conveyed onto the original platen glass 2 and a reflecting mirror 5 that guides light reflected by the originals on the original platen glass 2 to a reflecting mirror 6. The reflecting mirror 6 cooperates with a reflecting mirror 7 to guide reflected light from the reflecting mirror 5 to a lens 8. The lens 8 forms the reflected light into an optical image on an image sensor 9. The image sensor 9 converts the formed optical image into an electric signal. The electric signal is subjected to predetermined processing and then inputted to the exposure controller 10 as an image signal.

The exposure controller 10 emits laser light based on the input image signal to expose and scan a photosensitive drum 11 using the laser light. The exposure and scanning with the laser light forms a latent image corresponding to the laser light on the photosensitive drum 11. Then, toner is supplied from a developer 13 to visualize the latent image formed on the photosensitive drum 11 as a toner image.

Further, in timing synchronous with the start of the emission of laser light, a sheet is fed from a cassette 14 or 15. The sheet is then conveyed to a transfer section 16 via a conveying path 19. The transfer section 16 transfers the toner image from the photosensitive drum 11 to the conveyed sheet. The sheet to which the toner image has been transferred is conveyed to a fixing section 17.

The fixing section 17 thermally presses the toner image on the sheet to fix it to the sheet. The sheet that has passed through the fixing section 17 is discharged to the outside through a pair of discharging rollers 18.

After the toner image has been transferred, a cleaner 25 cleans the surface of the photosensitive drum 11. An auxiliary charger 26 then eliminates static electricity from the surface. A pre-exposure lamp 27 removes residual charges from the surface of the photosensitive drum 11. A primary charger 28 then brings the surface of the photosensitive drum 11 into a state in which it can be properly charged, and then actually charges the surface of the photosensitive drum 11.

The above series of processes are repeated to form a plurality of images.

Further, the image forming apparatus according to the present embodiment is provided with a double-sided path 29 to enable double-sided printing. For double-sided printing, a sheet one side of which has been printed is turned upside down and then guided to the double-sided path 29, via which the sheet is again conveyed to the photosensitive drum 11. A corresponding image is formed on the other side of the sheet in the same manner as described above.

As shown in FIG. 3, the exposure controller 10 is comprised of the image processing circuit 36 that performs pixel division modulation on an externally input image signal and outputs the pixel-division-modulated image signal in synchronism with the image clock, and a laser driving device 31 that drives a semiconductor laser 43 based on the pixel-division-modulated image signal outputted from the image processing circuit 36.

The semiconductor laser 43 contains a photodiode sensor (PD sensor, not shown) that detects part of laser light. The laser driving device 31 uses a detection signal from the PD sensor to execute APC (Auto Power Control) of the semiconductor laser 43. Laser light emitted from the semiconductor laser 43 is formed into almost parallel beams via an optical system having a collimator lens, a diaphragm, and so forth. These beams having a predetermined beam diameter are incident on a rotary polygon mirror 33. The rotary polygon mirror 33 rotates at an isometric speed in a predetermined direction. With this rotation of the rotary polygon mirror 33, the laser beams incident on the rotary polygon mirror 33 are reflected in the form of polarized beams that continuously vary their angles. The laser beams reflected as the polarized beams are condensed by an f-θ lens 34. At the same time, the f-θ lens 34 carries out distortion correction so as to ensure temporal linearity of scanning. Consequently, the laser beams having passed passed through the f-θ lens 34 are coupled together and scanned over the photosensitive drum 11 at a uniform speed in a predetermined direction. A beam sensor (BD sensor) 122 is provided in the vicinity of one end of the photosensitive drum 11 to detect laser beams reflected by the rotary polygon mirror 33. A detection signal from the beam sensor is used as a synchronizing signal used to synchronize the rotation of the rotary polygon mirror 33 with data writing.

The laser driving device 31 employs a driving method of detecting the output of laser beams in a light detection section during a single scanning operation to keep constant a driving current for the semiconductor laser 43 over the single scanning operation, in order to maintain the quantity of laser beams at a constant value during the single scanning operation.

As shown in FIG. 4, the image processing circuit 36 has a control signal generating circuit 101. The control signal generating circuit 101 generates a FIFO (First In-First Out Memory) control signal 102 for a FIFO clock generating circuit 105, a parallel-serial (hereinafter simply referred to as "PS") conversion control signal 103 for a PS clock generating circuit 107, and a serial-parallel (hereinafter simply referred to as "SP") conversion control signal 104 for an SP clock generating circuit 109. The FIFO clock generating circuit 105 generates a read clock 106 for a FIFO 112 based on a reference clock 111 and the FIFO control signal 102. The PS clock generating circuit 107 generates a conversion clock 108 for the PS converting circuit 118 based on the reference clock 111 and the PS conversion control signal 103. The SP clock generating circuit 109 generates an SP conversion clock 110 for the SP converting circuit 120 based on the reference clock 111 and the SP conversion control signal 104. Further, the SP conversion clock 110 is outputted as the image clock.

The FIFO 112 is supplied with a FIFO write address reset signal 113 and a write clock 114 from a controller in the main body of the image forming apparatus, not shown. An image signal from an external image generating section, not shown, is also inputted pixel by pixel to the FIFO 112. Specifically, 16-bit write pixel data 115 of each pixel is inputted to the FIFO 112. The FIFO 112 outputs 16-bit read pixel data 117 in response to the read clock 106 from the clock generating circuit 105 and an address reset signal 116 from the controller in the main body of the image forming apparatus.

The read pixel data 117 outputted from the FIFO 112 is inputted to the PS converting circuit 118. The PS converting circuit 118 converts the inputted 16-bit read pixel data 117 into a serial pixel signal 119 in response to the PS conversion clock 108 and then outputs the serial pixel signal 119. The outputted serial pixel signal 119 is inputted to the SP converting circuit 120. The SP converting circuit 120 converts the inputted serial pixel signal 119 into a 16-bit parallel pixel signal 121 in response to the SP conversion clock 110 and then outputs the 16-bit parallel pixel signal 121. A BD signal 151 outputted from the BD sensor 122, not shown, is counted by a line counter 150, which outputs a line select signal 152 that is cycled, for example, every 4 lines. In response to the line select signal 152, a delay time generating circuit 153 generates four delay time periods 154 synchronous with the SP conversion control signal 110. A timing adjusting circuit 155 delays the parallel pixel signal 121 for each line based on the corresponding delay time period 154 and then outputs the parallel pixel signal 121 as image data 156.

Figure 9:
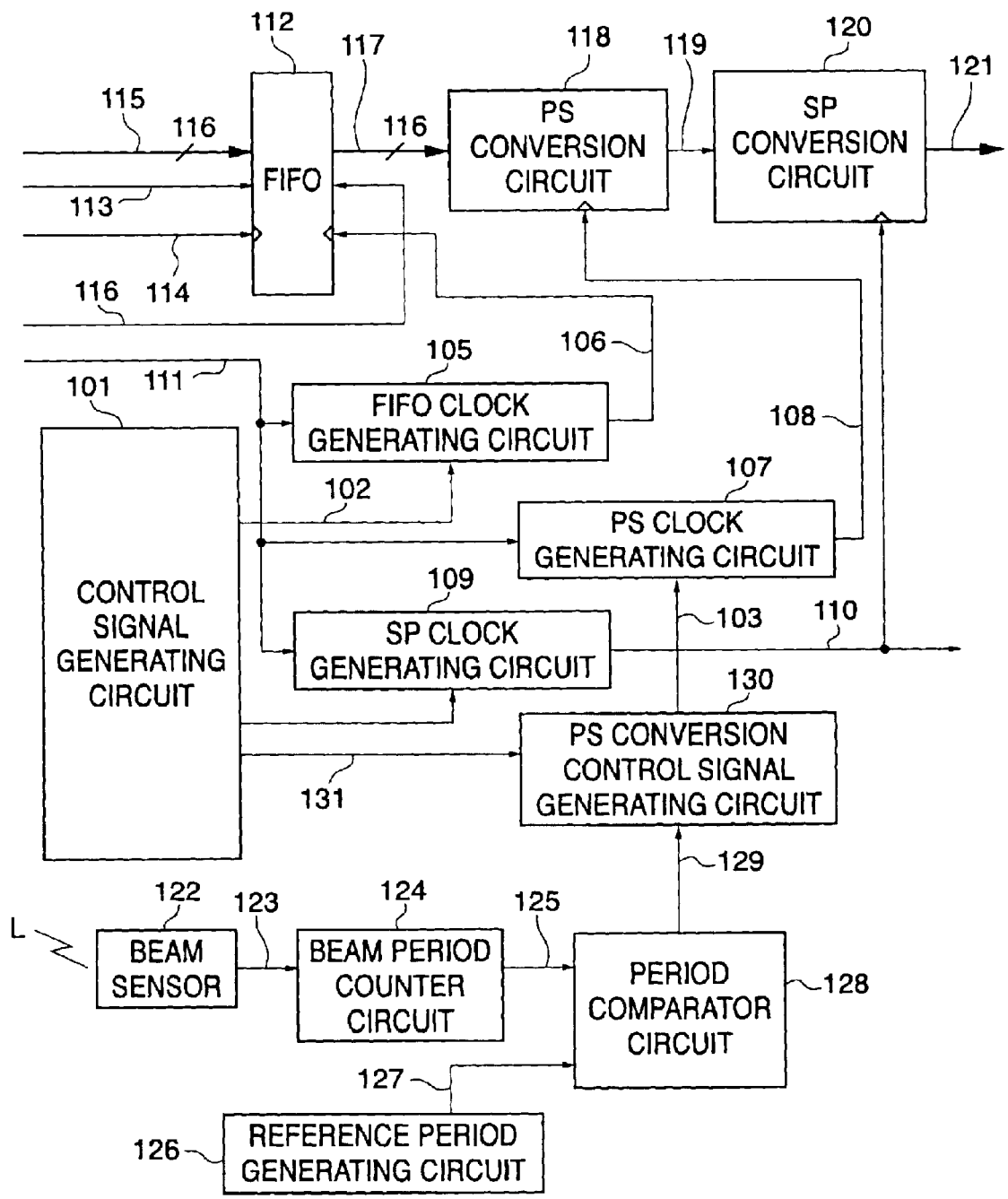
FIG. 9 is a block diagram showing the configuration of a variation of the image processing circuit in FIG. 4.

Alternatively, the image processing circuit 36 may be configured as shown in FIG. 9.

Description is omitted of elements and parts in FIG. 9 which are denoted by the same reference numerals as those in FIG. 4. The BD sensor 122 receives a beam L emitted from a semiconductor laser, not shown, and then uses a photoelectric effect to generate a beam detection signal 123, that is, an electric signal. A beam period counter circuit 124 counts the period of the beam detection signal 123 and then outputs the result to a period comparator circuit 128 as a beam period signal 125. A reference period generating circuit 126 generates a reference period signal 127 set based on resolution, scanning speed, and optical characteristics. The period comparator circuit 128 compares the period of the beam period signal 125 with the period of the reference period signal 127. Based on the result of the comparison, a parallel-serial (hereinafter referred to as "PS") conversion control signal generating circuit 130 sets a correction amount. The PS conversion control signal generating circuit 130 then generates the PS conversion control signal 103 that determines the position of a pixel to be corrected according to a PS conversion position signal 131 inputted from the control signal generating circuit 101, and then outputs the PS conversion control signal 103 to the PS clock generating circuit 107.

Figure 10:
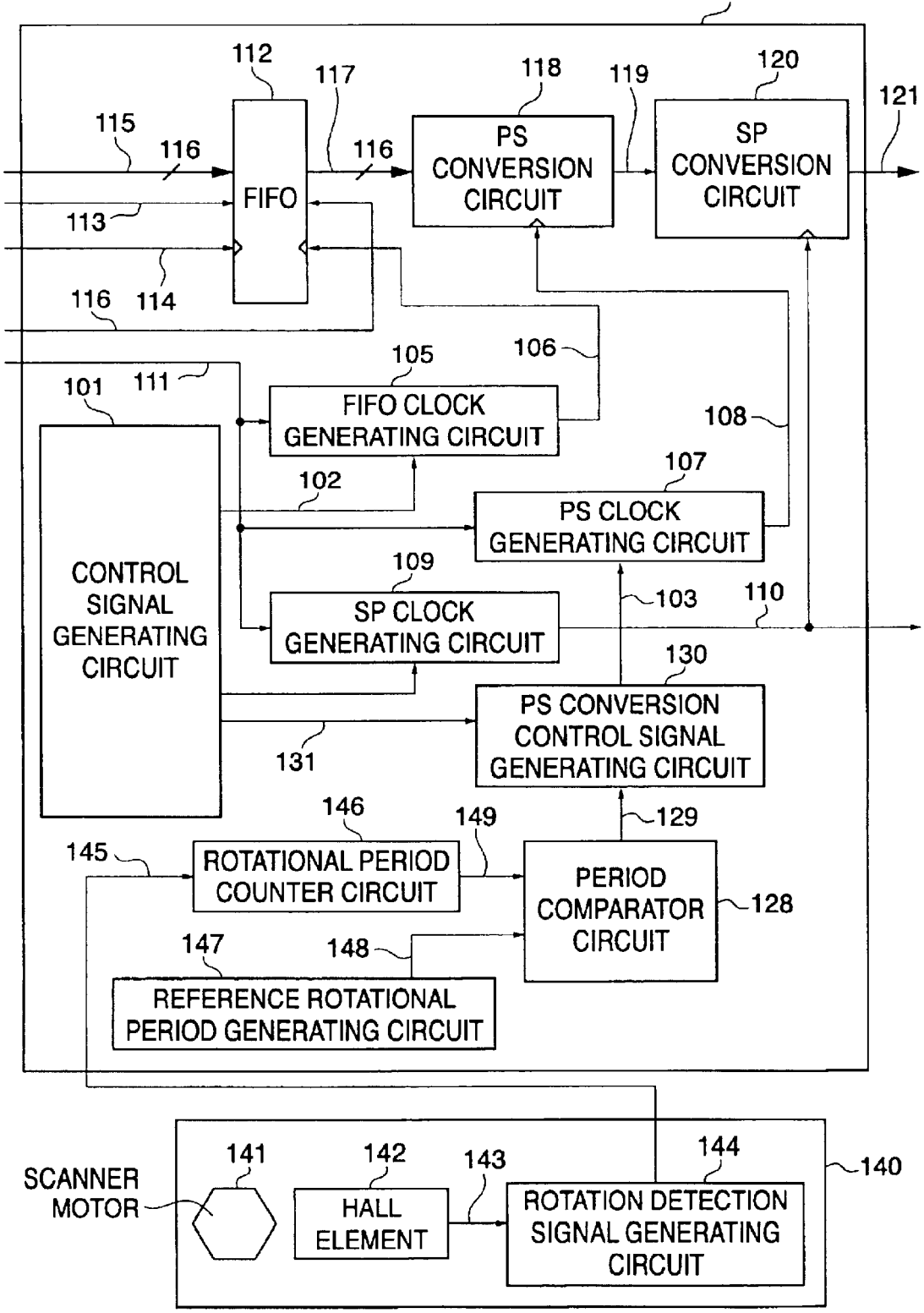
FIG. 10 is a block diagram showing the configuration of another variation of the image processing circuit in FIG. 4.

Alternatively, the image processing circuit 36 may be configured as shown in FIG. 10.

Description is omitted of elements and parts in FIG. 10 which are denoted by the same reference numerals as those in FIG. 4.

Reference numeral 142 designates a Hall element 142 that generates a potential difference as a Hall element output signal 143 based on a variation in a magnetic field generated by the rotation of a scanner motor 141. A rotation detection signal generating circuit 144 converts the Hall element output signal 143 into a rotation detection signal 145 of a predetermined voltage level.

A rotational period counter circuit 146 can detect irregularities in the rotation of the scanner motor 141 caused by low frequency fluctuations therein by counting the period of the rotation detection signal 145. An output signal from the rotational period counter circuit 146 is inputted to the period comparator circuit 128 as a rotational period signal 149.

A reference rotational period generating circuit 147 generates a reference rotational period signal 148 set based on resolution, scanning speed, the number of polygon mirror faces, and the like. The period comparator circuit 128 compares the period of the rotational period signal 149 with the period of the reference rotational period signal 148. Based on the result of the comparison, the PS conversion control signal generating circuit 130 sets a correction amount. The PS conversion control signal generating circuit 130 then generates the PS conversion control signal 103 that determines the position of a pixel to be corrected according to the PS conversion position signal 131 inputted from the control signal generating circuit 101. The PS conversion control signal generating circuit 130 subsequently outputs the PS conversion control signal 103 to the PS clock generating circuit 107.

Now, the operation of the image processing circuit 36 will be described with reference to FIG. 5.

Figure 5:
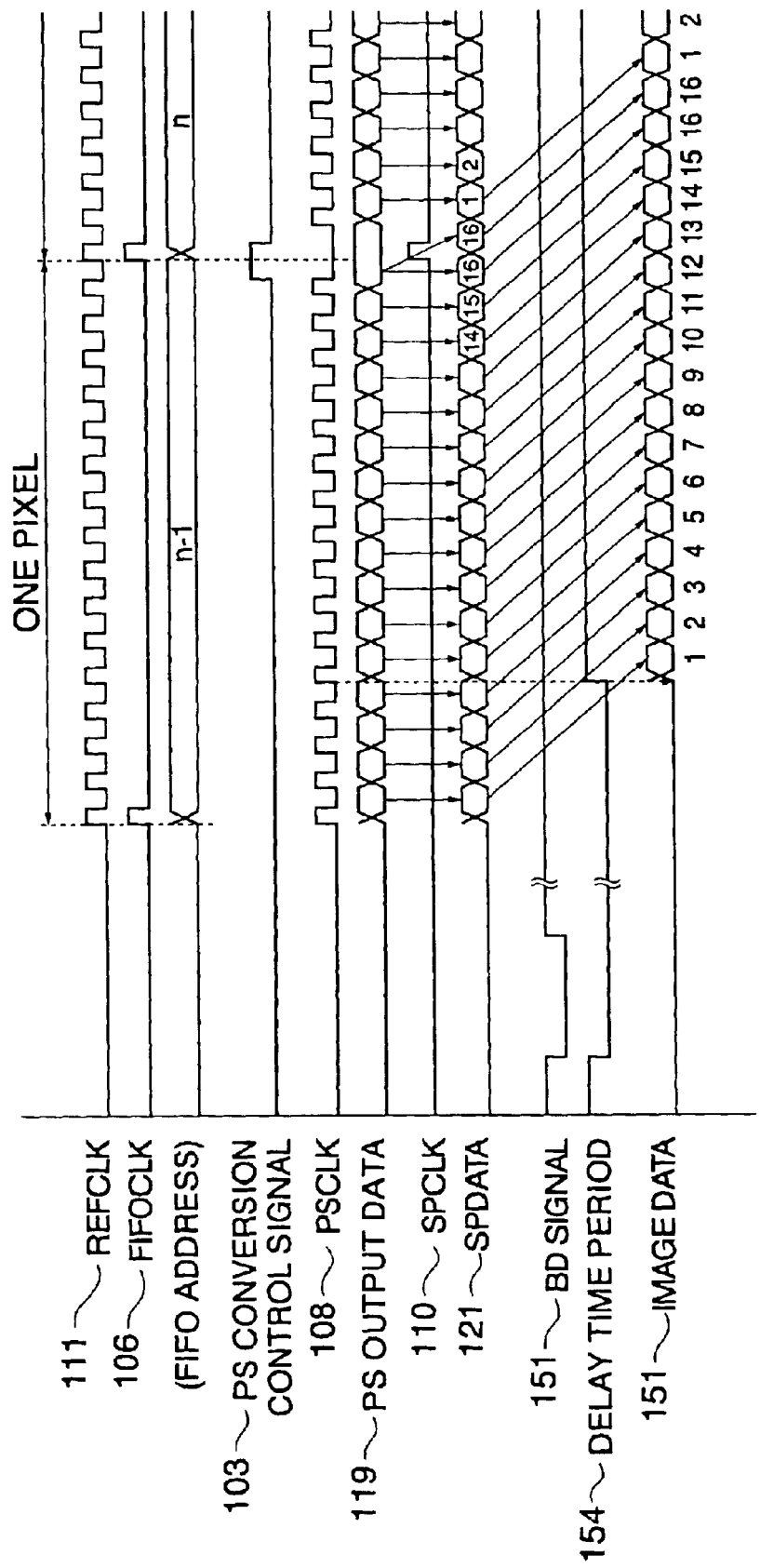
FIG. 5 is a timing chart of signals generated by main blocks of the image processing circuit in FIG. 4.

FIG. 5 is a timing chart of signals generated by main blocks of the image processing circuit 36 in FIG. 4.

The reference clock (REFCLK) 111 (shown in FIG. 5A) acts as a reference for the read clock (FIFOCLK) 106 (shown in FIG. 5B), the PS conversion clock (PSCLK) 108 (shown in FIG. 5E), and the SP conversion clock (SPCLK) 110 (shown in FIG. 5G). The reference clock (REFCLK) 111 has a frequency proportional to the resolution of pixel division modulation, and set in relation to the frequency of the SP conversion clock 110 which is used as the image clock. In the present embodiment, if the resolution of pixel division modulation is 16 bits, the frequency of the reference clock (REFCLK) 111 is set to be 16 times as high as that of the SP conversion clock 110.

The read clock (FIFOCLK) 106 (shown in FIG. 5B) is used to indicate timing in which the pixel data 117 is read pixel by pixel from the FIFO 112. When the next pixel to which new bit data has been added is to be read out, the read clock 106 acts to delay the read timing by one-bit data so that the final bit of the immediately preceding pixel is shifted to this next pixel as the leading bit data thereof. The read clock 106 is kept at the same period until new bit data is again added to a pixel.

The PS conversion control signal 103 (shown in FIG. 5D) is used to decimate the PS conversion clock 108 so as to prevent updating of output data from the FIFO 112 at the leading bit of a pixel to which a new bit data is added. The PS conversion control signal 103 causes the PS output data (serial pixel signal) 119 (shown in FIG. 5F) to have added thereto the final bit data of the immediately preceding pixel as its leading bit data without the leading bit data of its FIFO address (n, shown in FIG. 5C) being updated.

The SP conversion clock (SPCLK) 110 (shown in FIG. 5G) is outputted as the image clock that defines one pixel section, with a frequency that is one-sixteenth of the frequency of the read clock (FIFOCLK) 106.

The SP conversion clock (SPCLK) 110 converts the PS output data 119 (corresponding to the FIFO address (n)) which has added thereto the final bit data of the immediately preceding pixel at its leading bit data, into the 16-bit parallel pixel signal (SPDATA) 121 (shown in FIG. 5H), before being outputted.

The delay time period 154 (shown in FIG. 5J) for an arbitrary line is synchronized with the BD signal 151 (shown in FIG. 5I) to have its delay time period set based on the PS conversion clock 108. The parallel pixel signal (SPDATA) 121 starts to be outputted as the image data 156 (shown in FIG. 5K) in synchronism with the delay time period 154.

Figure 6:
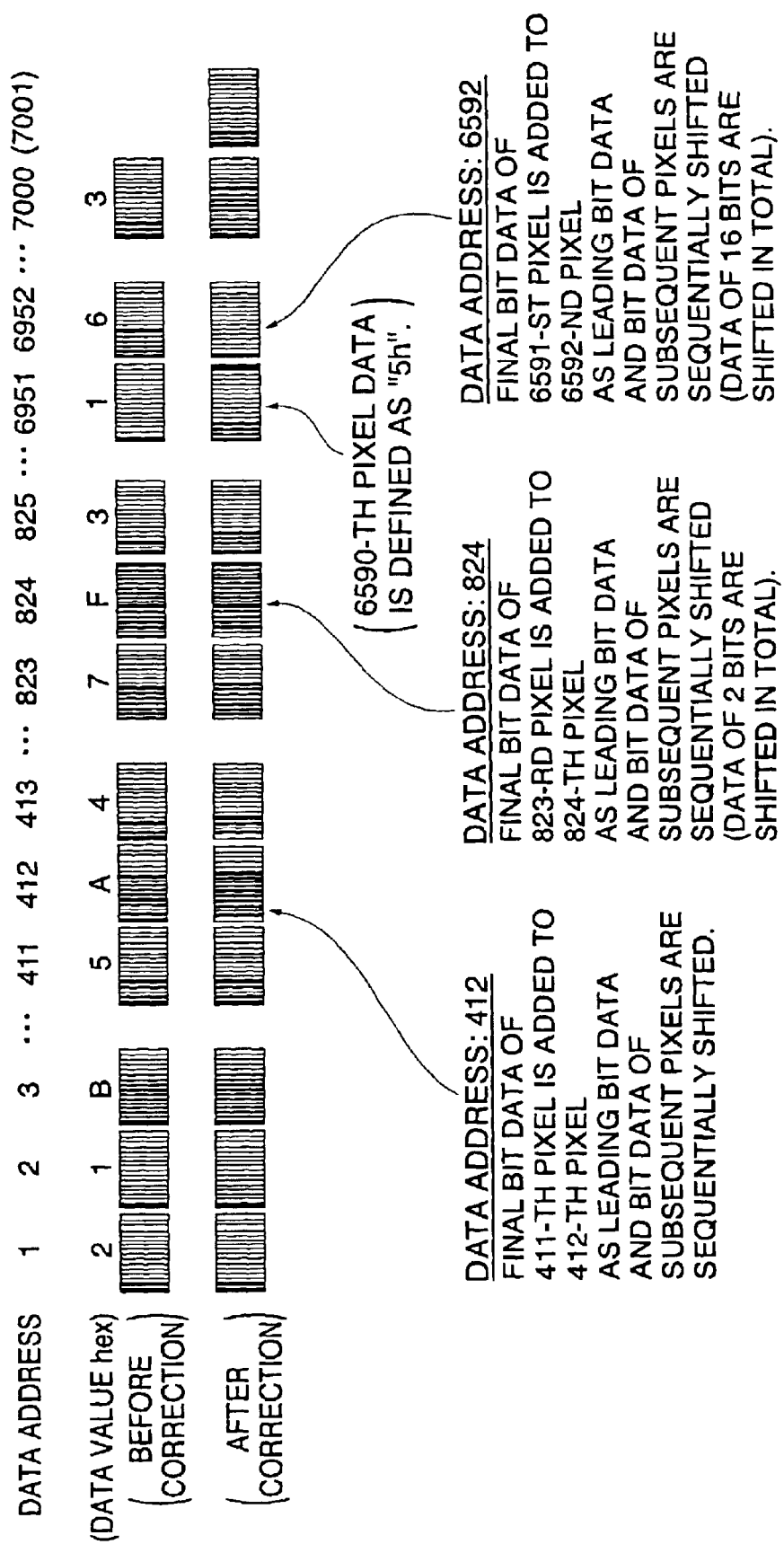
FIG. 6 is a view showing the structure of pixel data processed by a correction process executed by the image processing circuit in FIG. 4.

A description will be given of a specific example of the main scanning scale correcting process according to the present embodiment with reference to FIG. 6. FIG. 6 is a view showing an example of the structure of pixel data processed by main scanning scale correction executed by the image processing circuit 36 in FIG. 3.

In the present embodiment, one pixel is composed of 16-bit data. One line originally contains 7,000 pixels in total. From this total number of 7,000 pixels, the total number of pixels on one line is increased to 7,001 by the main scanning scale correcting process.

To evenly add 1 pixel/16-bit data to all of the 7,000 pixels on one line, the addresses (i.e. correction points) to which the 1 pixel/16 bit data is added are the 412-th, 824-th, 1,236-th, 1,648-th, 2,060-th, 2,472-nd, 2,834-th, 3,296-th, 3,708-th, 4,210-th, 4,532-nd, 4,944-th, 5,356-th, 5,768-th, 6,180-th, and 6,592-nd pixels (∵412≈7,000 pixels÷17).

Here, if, for example, the 412-th pixel data is defined as [A]hex and the 411-th pixel data is defined as [5]hex, then the final bit data of "0" of the 411-th pixel is added to the 412-th pixel at its leading bit data. Thus, the 412-th pixel data becomes as follows:

412-th pixel data
Before correction: 1111111111000000
After correction: 0111111111100000

In the same manner, the final bit data of "0" of the 412-th pixel is shifted to the leading bit of the 413-th pixel. Thus, the 413-th pixel data [4]hex is configured as follows:

412-th pixel data
Before correction: 1110000000000000
After correction: 0111000000000000

Likewise, the final bit data of each of the 414-th and subsequent pixel data is shifted to the leading bit of the next pixel. In this way, the 412-th to 823-th pixel data each have 1 bit of data thereof shifted to the next pixel.

Now, the 824-th pixel will be considered. Here, the 823-rd pixel data is defined as [7]hex and the 824-th pixel data is defined as [F]hex. The final bit of the 823-rd pixel data has already been replaced by the bit data of the immediately preceding or 822-nd pixel. Further, the final bit data of "0" of the 823-rd pixel data has already been shifted to the leading bit of the 824-th pixel data. Here, since the 824-th pixel is a correction point, the final bit data of "0" of the 823-rd pixel data is added to the 824-th pixel data at its leading bit. Thus, the 824-th pixel data becomes as follows:

824-th pixel data
Before correction: 1111111111111111
After correction: 0011111111111111

Accordingly, the final bit data of "1" of the 824-th pixel data is shifted to the leading bit of the 825-th pixel. In this case, before this shifting of the final bit data, the final bit data of the 824-th pixel data before correction has already been shifted to the leading bit of the 825-th pixel data. Thus, the 825-th pixel data [3]hex becomes as follows:

825-th pixel data
Before correction: 1110000000000000
After correction: 1111000000000000

Therefore, 2 bits of data are shifted from each of the 825-th and subsequent pixel data to the next pixel data. Then, for the pixel corresponding to the next correction point, the final bit data of the immediately preceding pixel data is added to this pixel in the same manner as described above.

Here, as to the 6,592-nd pixel data which is the last correction point, the 6,591-st pixel data before correction is defined as [1]hex, and the 6,592-nd pixel data before correction is defined as [6]hex. As a result of the shifting of bit data, the 2-nd to 16-th bit data of the 6,590-th pixel data before correction have been shifted to the 6,591-st pixel data, and the original leading bit data of the 6,591-st pixel data has been shifted to its final bit. Further, the 2-nd to 16-th bit data of the 6,591-st pixel data have been shifted to the 6,592-nd pixel data, and the original leading bit data of the 6,592-nd pixel data has been shifted to its final bit. In this case, since the 6,592-nd pixel is a correction point, the final bit data of "1" of the 6,591-st pixel data is added to the 6,592-nd pixel data at its leading bit data. Thus, the 6,592-nd pixel data becomes as follows:

6,592-nd pixel data

Before correction: 1111110000000000

After correction: 1000000000000000

As described above, the corrected 6,592-nd pixel data has the same value as that of the 6,591-st pixel data before correction. Then, 16 bits of data are shifted from each of the 6,591-st pixel data and subsequent pixel data to the next pixel. Finally, new pixel data is formed as the 7,001-st pixel data. That is, the number of pixels on one line is increased, and thus the main scanning scale correction is properly performed to secure required printing quality.

For example, in an image forming apparatus that has a function of printing both sides of a sheet such as the image forming apparatus according to the present embodiment, the main scanning scale for each side of the sheet can be properly corrected for double-sided printing. This solves the problem that the image size on one side surface of the sheet differs from that on the other side surface due to the shrinkage of the paper during fixation.

Figure 7:
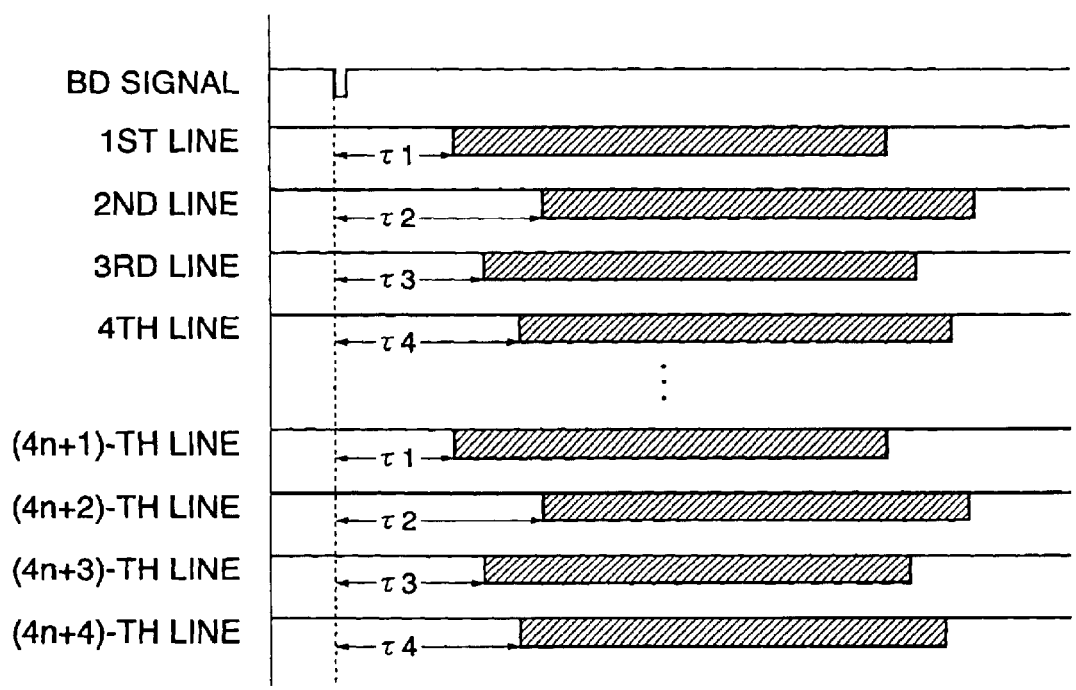
FIG. 7 is a timing chart showing a process for delaying a write starting position by a predetermined time period, of the main scanning scale correction method.

A description will be given of a specific example in which a write starting position is delayed by a predetermined time period for each predetermined line according to the main scanning scale correcting method of the present embodiment, with reference to FIG. 7. Here, it is assumed that the delay time period is set to different time periods for respective ones of every 4 lines set as one period. FIG. 7 is a timing chart showing a process for delaying a write starting position by a predetermined time period. A beam detection (hereinafter simply referred to as "BD") signal is outputted from the BD sensor 122 to determine an image write starting position. The delay time period given before image data is outputted in response to a BD signal is set as shown below. All or some of the delay time periods $\tau 1$ to $\tau 4$ may be different from one another.

(4n+1)-th line: delay time period $\tau 1$ (4n+2)-th line: delay time period $\tau 2$ (4n+3)-th line: delay time period $\tau 3$ (4n+4)-th line: delay time period $\tau 4$ ($n \geq 0$)

Thus, for the first, fifth, ninth, . . . , (4n+1)-th lines, data output is started the delay time period $\tau 1$ later than the output of a BD signal. Similarly, for the second, sixth, tenth, . . . , (4n+2)-th lines, data output is started the delay time period $\tau 2$ later than the output of a BD signal. Similar operations are performed for the other lines. Thus, description thereof is omitted.

Figure 8:
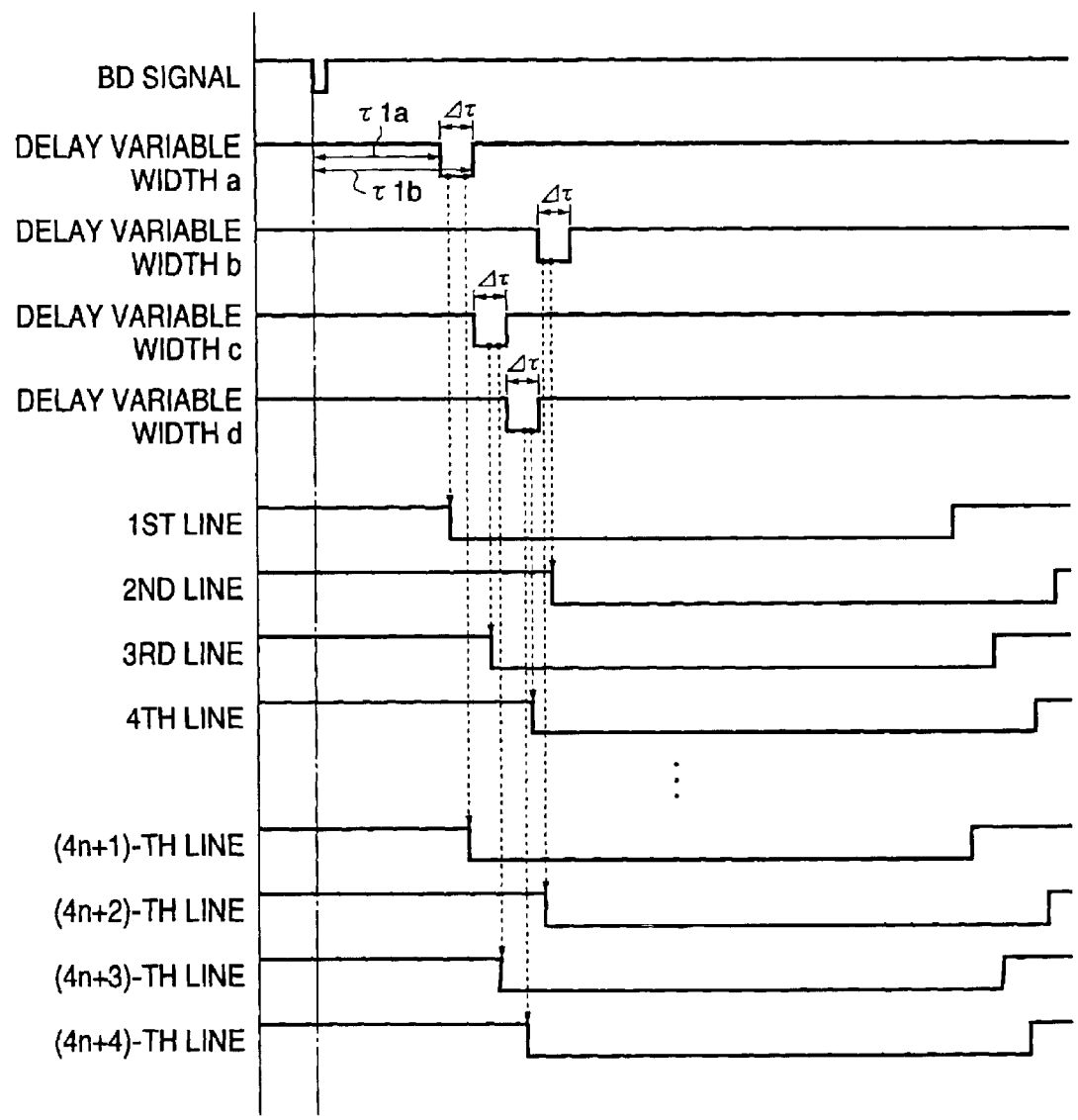
FIG. 8 is a flowchart showing another example of the process for delaying a write starting position by a predetermined time period, of the main scanning scale correction method.

Another method will be described with reference to FIG. 8. A BD signal is outputted from the BD sensor 122 to determine an image write starting position. The delay time period given before image data is outputted in response to a BD signal is set as shown below. All the delay time periods $\tau 1$ to $\tau 4$ have different delay starting time points and are each set at an arbitrary desired time point within the same delay range $\Delta \tau$ for all the delay time periods $\tau 1$ to $\tau 4$.

(4n+1)-th line: delay variable width a $\tau 1 \rightarrow \tau 1 a - \tau 1 b$ (4n+2)-th line: delay time period $\tau 2 \rightarrow \tau 2 a - \tau 2 b$ (4n+3)-th line: delay time period $\tau 3 \rightarrow \tau 3 a - \tau 3 b$ (4n+4)-th line: delay time period $\tau 4 \rightarrow \tau 4 a - \tau 4 b$ ($n \geq 0$)

$\Delta \tau = \tau 1 b - \tau 1 a = \tau 2 b - \tau 2 a = \tau 3 b - \tau 3 a = \tau 4 b - \tau 4 a$ Thus, for the first, fifth, ninth, . . . , (4n+1)-th lines, data output is started an arbitrary time period later than the output of a BD signal within $\tau 1$. Similarly, for the second, sixth, tenth, . . . , (4n+2)-th lines, data output is started an arbitrary time period later than the output of a BD signal within $\tau 2$. Similar operations are performed for the other lines. Thus, description thereof is omitted.

Although the image forming apparatus according to the present embodiment described above is of the type having a function of printing both sides of a sheet, alternatively, the present invention may be applied even to an image forming apparatus that can scan different lines using two laser beams at the same time. In this case, the above main scanning scale correcting process can be used to execute corrections so that the respective main scanning scales achieved by these laser beams are equal to each other. In this case, the main scanning scale achieved by one of the laser beams may be corrected so that it becomes equal to the main scanning scale achieved by another laser beam, or the respective main scanning scales achieved by the two laser beams may be individually corrected. It goes out without saying that the above main scanning scale correcting method is applicable to the correction of the main scanning scale for each color in an image forming apparatus having exposure means (photosensitive drums) for yellow, magenta, cyan, and black, respectively.

Further, although according to the present embodiment, for each of one or more correction points on a line on the photosensitive drum which is scanned by laser light, the final bit data of pixel-division-modulated pixel data of the pixel immediately preceding the correction point is added to the pixel located at the correction point as the leading bit data of pixel-division-modulated pixel data of this pixel, and then predetermined bit data of pixel-division-modulated pixel data of each of the pixels following the correction point are sequentially shifted to the next pixel to generate pixel data of a new pixel added for this line alternatively, for each correction point on a line, the leading bit data of pixel-division-modulated pixel data of the pixel located at the correction point may be added to the same pixel as the leading bit data of the pixel-division-modulated pixel data of this pixel, and then predetermined bit data of pixel-division-modulated pixel data of each of the pixels subsequent to the correction point may be sequentially shifted to the next pixel to generate pixel data of a new pixel added for this line.

It is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

The storage medium for supplying the program code is not limited to a ROM, and a floppy (registered trademark)

disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a download carried out via a network may be used.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiment thereof may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An image forming apparatus comprising:
   a pixel division modulating device that performs pixel-division modulation on an input image signal and outputs the pixel-division-modulated image signal in synchronism with an image clock of a fixed frequency;
   a laser light source;
   a driving device that drives said laser light source based on the image signal outputted from said pixel division modulating device to modulate laser light emitted from said laser light source;
   a latent image carrier; and
   a scanning device that scans said latent image carrier using the laser light emitted from said laser light source to form a latent image on said latent image carrier;
   wherein said pixel division modulating device comprises a correction device that, for each of at least one correction point on one of lines along which scanning is carried out on said latent image carrier by laser light, adds final bit data of pixel-division-modulated pixel data of a pixel preceding the correction point to pixel-division-modulated pixel data of a pixel located at the correction point as leading bit data thereof, and sequentially shifts predetermined bit data of pixel-division-modulated pixel data of each of pixels subsequent to the correction point to a next pixel to generate pixel data of at least one new pixel added for the one line, and an output device that outputs the pixel data of the generated at least one new pixel in synchronism with the image clock of the fixed frequency.

2. An image forming apparatus according to claim 1, wherein the at least one correction point are determined in advance.

3. An image forming apparatus according to claim 1, wherein the number of the at least one correction point is determined to be an integral multiple of resolution of pixel division modulation executed by said pixel division modulating device.

4. An image forming apparatus according to claim 1, further comprising an image write reference signal output device that outputs an image write reference signal, and a delay device that delays timing in which output of the pixel data is started in synchronism with the image clock of the fixed frequency, by a predetermined time period for each of preset lines in response to the image write reference signal.

5. An image forming apparatus comprising:
   a pixel division modulating device that performs pixel-division modulation on an input image signal and outputs the pixel-division-modulated image signal in synchronism with an image clock of a fixed frequency;
   a laser light source;
   a driving device that drives said laser light source based on the image signal outputted from said pixel division modulating device to modulate laser light emitted from said laser light source;
   a latent image carrier; and
   a scanning device that scans said latent image carrier using the laser light emitted from said laser light source to form a latent image on said latent image carrier;
   wherein said pixel division modulating device comprises a correction device that, for each of at least one correction point on one of lines along which scanning is carried out on said latent image carrier by laser light, adds leading bit data of pixel-division-modulated pixel data of a pixel preceding the correction point to pixel-division-modulated pixel data of a pixel located at the correction point as leading bit data thereof, and sequentially shifts predetermined bit data of pixel-division-modulated pixel data of each of pixels subsequent to the correction point to a next pixel to generate pixel data of at least one new pixel added for the one line, and an output device that outputs the pixel data of the generated at least one new pixel in synchronism with the image clock of the fixed frequency.

6. An image forming apparatus according to claim 5, wherein the at least one correction point are determined in advance.

7. An image forming apparatus according to claim 5, wherein the number of the at least one correction point is determined to be an integral multiple of resolution of pixel division modulation executed by said pixel division modulating device.

8. An image forming apparatus according to claim 5, further comprising an image write reference signal output device that outputs an image write reference signal, and a delay device that delays timing in which output of the pixel data is started in synchronism with the image clock of the fixed frequency, by a predetermined time period for each of preset lines in response to the image write reference signal.

9. A main scanning scale correcting method for an image forming apparatus comprising a pixel division modulating device that performs pixel-division modulation on an input image signal and outputs the pixel-division-modulated image signal in synchronism with an image clock of a fixed frequency, a laser light source, a driving device that drives the laser light source based on the image signal outputted from the pixel division modulating device to modulate laser light emitted from the laser light source, a latent image carrier, and a scanning device that scans the latent image carrier using the laser light emitted from the laser light source to form a latent image on the latent image carrier, the method comprising the steps of:
   adding, for each of at least one correction point on one of lines along which scanning is carried out on said latent image carrier by laser light, final bit data of pixel-division-modulated pixel data of a pixel preceding the correction point to pixel-division-modulated pixel data of a pixel located at the correction point as leading bit data thereof, and sequentially shifting predetermined bit data of pixel-division-modulated pixel data of each of pixels subsequent to the correction point to a next pixel to generate pixel data of at least one new pixel added for the one line; and outputting the pixel data of the generated at least one new pixel in synchronism with the image clock of the fixed frequency.

10. A main scanning scale correcting method according to claim 9, wherein the at least one correction point are determined in advance.

11. A main scanning scale correcting method according to claim 9, wherein the number of the at least one correction point is determined to be an integral multiple of resolution of pixel division modulation executed by said pixel division modulating device.

12. A main scanning scale correcting method according to claim 9, wherein the image forming apparatus further comprises an image write reference signal output device that outputs an image write reference signal, and wherein the method further comprises a step of delaying timing in which output of the pixel data is started in synchronism with the image clock of the fixed frequency, by a predetermined time period for each of preset lines in response to the image write reference signal.

13. A main scanning scale correcting method for an image forming apparatus comprising a pixel division modulating device that performs pixel-division modulation on an input image signal and outputs the pixel-division-modulated image signal in synchronism with an image clock of a fixed frequency, a laser light source, a driving device that drives the laser light source based on the image signal outputted from the pixel division modulating device to modulate laser light emitted from the laser light source, a latent image carrier, and a scanning device that scans the latent image carrier using the laser light emitted from the laser light source to form a latent image on the latent image carrier, the method comprising the steps of:

adding, for each of at least one correction point on one of lines along which scanning is carried out on said latent image carrier by laser light, leading bit data of pixel-division-modulated pixel data of a pixel preceding the correction point to pixel-division-modulated pixel data of a pixel located at the correction point as leading bit data thereof, and sequentially shifting predetermined bit data of pixel-division-modulated pixel data of each of pixels subsequent to the correction point to a next pixel to generate pixel data of at least one new pixel added for the one line; and outputting the pixel data of the generated at least one new pixel in synchronism with the image clock of the fixed frequency.

14. A main scanning scale correcting method according to claim 13, wherein the at least one correction point are determined in advance.

15. A main scanning scale correcting method according to claim 13, wherein the number of the at least one correction point is determined to be an integral multiple of resolution of pixel division modulation executed by said pixel division modulating device.

16. A main scanning scale correcting method according to claim 13, wherein the image forming apparatus further comprises an image write reference signal output device that outputs an image write reference signal, and wherein the method further comprises a step of delaying timing in which output of the pixel data is started in synchronism with the image clock of the fixed frequency, by a predetermined time period for each of preset lines in response to the image write reference signal.

* * * * *